April 12, 1927.
G. B. GRIFFIN
CONTAINER FOR ARTIFICIAL BAIT AND THE LIKE
Filed Nov. 28, 1925   2 Sheets-Sheet 1
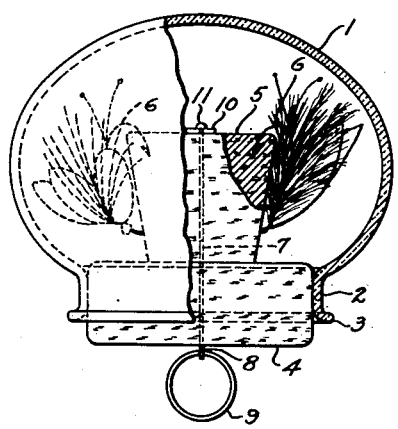
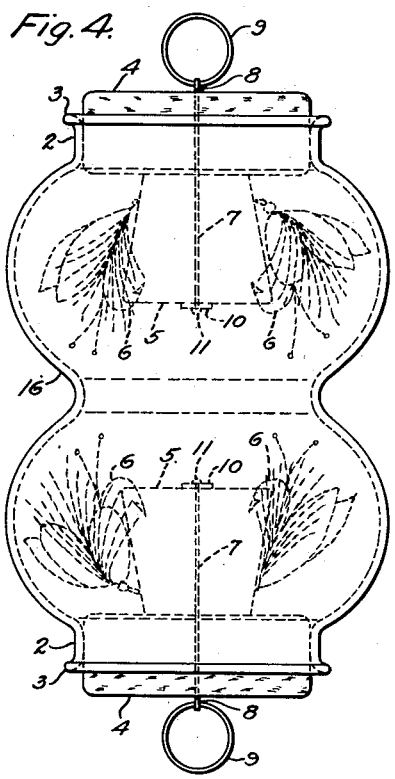
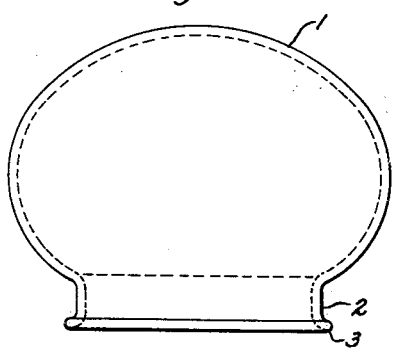
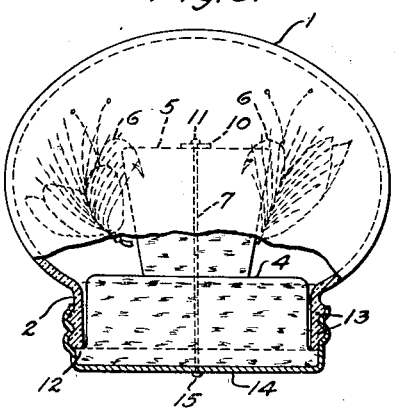
WITNESSES:
INVENTOR
George Brewer Griffin.
BY
ATTORNEY April 12, 1927.
G. B. GRIFFIN
1,624,233
CONTAINER FOR ARTIFICIAL BAIT AND THE LIKE
Filed Nov. 28, 1925
2 Sheets-Sheet 2
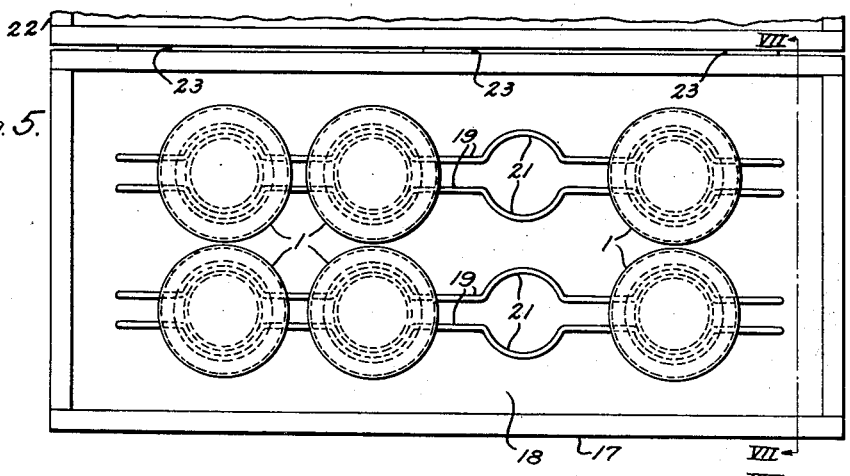
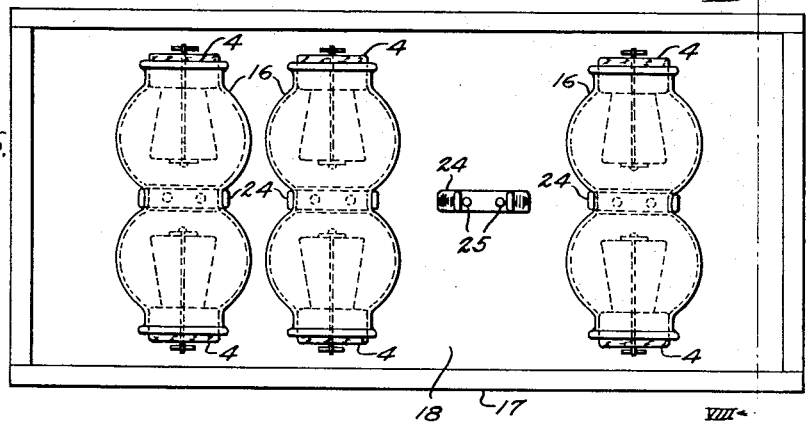
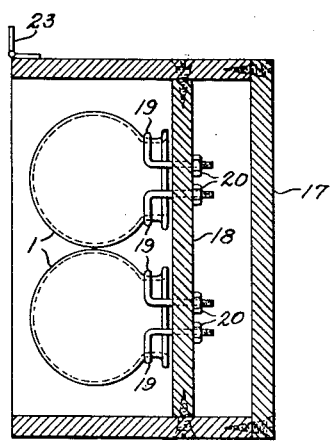
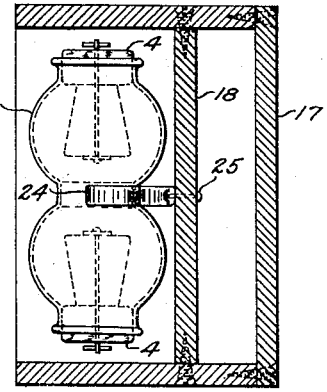
INVENTOR
George Brewer Griffin.
BY
Wesley G. Carr
ATTORNEY Patented Apr. 12, 1927.

1,624,233

UNITED STATES PATENT OFFICE.

GEORGE BREWER GRIFFIN, OF PITTSBURGH, PENNSYLVANIA.

CONTAINER FOR ARTIFICIAL BAIT AND THE LIKE.

Application filed November 28, 1925. Serial No. 71,938.

My invention relates to containers for artificial bait and the like and, more particularly, to such containers or receptacles in which a supply of such bait may be carried by fishermen and kept in first-class condition.

One object of my invention is to provide a container in which a plurality of pieces of artificial lure, such as dry flies or other bait, may be safely and conveniently carried, either on the person as a single unit, with assorted varieties of bait or lures, or, as a stock storage means, in single or multiple units contained in a suitable case or holder and be protected from dust and moisture and damage by moths or other destructive vermin.

Another object of my invention is to provide a transparent waterproof container for artificial lure, bait or the like, whereby the condition of the supply stock may be immediately noted and a desired piece may be readily located and its availability known before the container is opened. The receptacles may also be used to store or carry gut leaders, either in a dry or a moist condition, deer fat for dry flies or even live bait, if desired.

Other objects and advantages of my invention will appear in the following detailed description, taken in connection with the accompanying drawings, in which:

Figure 1 is a view, partly in elevation and partly in section, of one form of container constructed in accordance with my invention;

Fig. 2 is an exploded view of the container shown in Fig. 1;

Fig. 3 is a view, partly in elevation and partly in section, of another form of container constructed in accordance with my invention;

Fig. 4 is an elevational view of still another form of container constructed in accordance with my invention;

Fig. 5 is a top plan view of a case or rack for holding a plurality of containers of the form shown in Figs. 1, 2 and 3;

Fig. 6 is a top plan view of a case or rack for holding a plurality of containers of the form shown in Fig. 4;

Fig. 7 is a view, in vertical section, of the case or rack shown in Fig. 5, taken along the line VII—VII; and Fig. 8 is a view, in vertical section, of the case or rack shown in Fig. 6, taken along the line VIII—VIII.

Like reference numerals indicate like parts in the different figures of the drawings.

Referring to Figs. 1 and 2 of the drawings, a container or receptacle member 1 of substantially prolate ellipsoidal shape is provided with a substantially tubular integral neck member 2 extending therefrom along an axis coinciding with the axis of revolution of the ellipsoidal surface of the container 1. The outer end of the tubular neck member 2 may be provided with a flange 3 to form an annular channel surrounding the neck member 2. The container 1 is preferably of relatively thick glass or other rigid transparent material.

A substantially cylindrical member 4 of cork, rubber or other resilient water-proof material is adapted to be fitted snugly in the neck member 2 to provide a closure therefor. The smaller end surface of a member 5, preferably of inverted frusto-conical shape, is secured to the inner flat surface of the closure member 4 by cement or other suitable means or formed integral therewith in such manner that its axis coincides with that of the member 4. Thus, when the closure member 4 is inserted in the neck member 2, the member 5 extends within the container 1, as shown in Fig. 1.

The member 5 is preferably of cork, but may be of any other suitable material, such, for example, as felt impregnated with deer fat or other oily substances, upon which a plurality of pieces 6 of artificial bait may be mounted by inserting the usual hook points of said pieces in the protruding larger end of the member 5 near the edge thereof, as shown in Figs. 1 and 2. The bait pieces 6 will then be disposed around the frusto-conical surface of the member 5, as shown. If desired, the closure member 4 and the mounting member 5 may be of the same material, and, in this event, the members 4 and 5 may be either integral or separate.

A relatively thin wire or rod or any suitable substitute 7 extends through the members 4 and 5, substantially along the axes thereof, and may be bent to form a loop 8 at the end adjacent the outer end of the closure member 4. A ring 9 extends through the loop 8 to serve as a handle to facilitate the removal of the closure member 4 from the neck 2. The other end of the member 7 may extend through a washer 10 adjacent the inner end of the mounting member 5 and be expanded to form a head 11 of greater diameter than the opening in the washer 10. Thus, when the ring 9 is pulled outwardly with respect to the container 1, force is applied to the inner end of the mounting member 5 to push the closure member 4 out of the neck 2, without any tendency to pull the members 4 and 5 apart, which might occur if a different type of handle were used. The member 7 also serves to secure the members 4 and 5 together, and, if desired, cement or other securing means may be dispensed with.

In the modification of my invention shown in Fig. 3, the body of the closure member 4 is adapted to enter the opening in the neck 2 freely and is provided with a flange 12 that is adapted to extend over the end of the neck 2 to provide a closure therefor. The outer surface of the neck 2 is provided with threads 13 that are adapted to co-operate with corresponding threads in a cover member 14 of pressed metal or other suitable material. The mounting member 5, closure member 4 and cover member 14 are secured together by an axial member 7 that may be identical with the member 7 of the embodiment of my invention shown in Figs. 1 and 2, with the exception that the outer end thereof may be provided with an expanded head 15 instead of the loop 8 and ring 9. Thus, it will be seen that, when the cover member 14 is screwed upon the threaded neck 2, the flange 12 is forced against the end of the neck 2 to constitute a tight closure therefor.

The modification of my invention shown in Fig. 4 of the drawings comprises a container 16 that is equivalent to the combination of two of the containers 1 shown in Figs. 1, 2 and 3 along a common axis with the necks 2 extending outwardly in opposite directions. It is obvious that this modified form of container may be provided with closure members of the type shown in Figs. 1 and 2, as illustrated, or of the type shown in Fig. 3. In other respects, the form of my invention shown in Fig. 4 does not differ from the forms shown in the figures previously described.

The case, container or rack shown in Figs. 5 and 7 comprises a box 17 of wood, metal or other suitable material, that may be provided with a false wall or mounting board 18. A plurality of resilient rods or wires 19 are disposed in a plane parallel to the face of the wall 18 a short distance in front thereof. The wires 19 are secured in position by reason of the fact that the ends thereof may either be bent backwardly at right angles to extend through suitable openings in the wall 18 and may be threaded to receive nuts 20 behind the wall 18, or may be brazed, welded or otherwise attached to the face portion of the mounting board.

The wires 19 are disposed in pairs and each of said pairs is provided with a plurality of co-operating arcuate portions 21 of substantially the same radius of curvature as the outer surface of the neck member 2 of the container 1 shown in Figs. 1, 2 and 3 of the drawings. Thus, the arcuate portions of each pair of wires 19 provide a plurality of resilient clamps, each of which is adapted to support a container 1, as shown in Figs. 5 and 7. The flanges 3 or threads 13 of the necks 2 of the containers prevent the containers from dropping or being jarred out of engagement with the clamp portions of the wires 19, but the resiliency of the wires 19 readily permits the insertion of the containers and the holding of them in position, or the removal of them, as may be desired.

The box 17 may be provided with a protective cover or lid 22 supported on hinge members 23, as shown, or by any other suitable means. The box 17, therefore, provides a convenient mounting for a single container or a plurality of containers 1 for the purpose of tranportation and the like.

The embodiment of my invention shown in Figs. 6 and 8 comprises a box 17 having a false wall 18, as in Figs. 5 and 7, but, instead of the wires 19, a plurality of resilient clamps 24, which are similar in construction to the well-known cartridge-fuse clamps, are secured to the wall 18 by rivets 25. Each of the clamps 24 is adapted to receive a container 16 of the type shown in Fig. 4 of the drawings. Thus, the box 17 may be adapted to provide convenient mounting, transporting or storage means for any of the types of artificial bait containers shown in Figs. 1, 2, 3 and 4 of the drawings.

From the foregoing description of my invention it will be seen that I have provided an improved container for artificial bait and the like, together with convenient means for mounting and transporting the same. A fisherman carrying such an equipment can readily locate any particular fly or other bait desired by reason of the fact that the containers 1 are transparent and the pieces of bait are so mounted therein that each piece can be seen clearly without removing it. When the desired piece is located, the container in which it is mounted may be readily removed from its supporting clamp in the stock-storage box, as previously described, and the closure member thereof may be quickly removed therefrom, transferred, if desired, to another unit carrier, as one of an assortment of various baits or lures, thus rendering any desired piece available for immediate use. In like manner, the pieces which have been removed from the containers may be replaced therein easily and conveniently. In addition to rendering the bait readily accessible to the fisherman, my invention also provides convenient and protective means for carrying the same and ensures protection from dust and moisture and such damage as might otherwise be caused by moths or other destructive vermin.

While I have shown and described several specific embodiments of my invention, I do not wish to be limited thereto, as various modifications may be made therein without departing from the spirit and scope of my invention, as set forth in the appended claims:

I claim as my invention:

1. A device for mounting and containing artificial bait and the like comprising a bulbous container having an opening therein and a compressible stopper removably seated in said opening and having a bait-mounting member projecting inwardly therefrom.

2. A device for mounting and containing artificial bait and the like comprising a transparent container having an opening therein and removable stopper for said opening having a bait-mounting member projecting inwardly therefrom.

3. A device for mounting and containing artificial bait and the like comprising a container of substantially prolate ellipsoidal shape, a tubular neck member extending therefrom to provide an opening therein, said tubular neck member being substantially co-axial with the surface of revolution of the container, a closure member for the neck member, and a bait-mounting member projecting inwardly from the closure member.

4. A device for mounting and containing artificial bait and the like comprising a container having an opening therein, a resiliently compressible stopper removably seated in said opening and having a puncturable bait-mounting member projecting inwardly from the closure member to receive and support the hooked points of lure or bait pieces.

5. A device for mounting and containing artificial bait and the like comprising a container substantially having a surface of revolution, an integral tubular neck member extending therefrom at each end thereof substantially along the axis of revolution of the surface of the container to provide two openings therein, a closure member for each of the openings, and a lure or bait-mounting member projecting inwardly from each of the closure members.

6. A container for artificial flys, comprising a transparent bulbous receptacle having a neck at one end and a removable stopper for said neck having a puncturable inner end to receive and hold the points of fly hooks.

7. A container for artificial bait comprising a bulbous receptacle having a neck at one end and a removable stopper for said neck having a puncturable inner end to receive and hold the points of bait hooks.

In testimony whereof, I have hereunto subscribed my name this 23rd day of November, 1925.

GEORGE BREWER GRIFFIN.